US010731587B2

(12) United States Patent
Martin et al.

(10) Patent No.: US 10,731,587 B2
(45) Date of Patent: Aug. 4, 2020

(54) DETECTION OF LEAKS AND BLOCKAGES IN A VEHICLE EXHAUST SYSTEM

(71) Applicant: Ford Global Technologies, LLC, Dearborn, MI (US)

(72) Inventors: Douglas Martin, Canton, MI (US); Benjamin Rocci, Ann Arbor, MI (US); Tyler Kelly, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 290 days.

(21) Appl. No.: 15/953,551

(22) Filed: Apr. 16, 2018

(65) Prior Publication Data

US 2019/0316538 A1 Oct. 17, 2019

(51) Int. Cl.

| | |
|---|---|
| ***G01M 15/04*** | (2006.01) |
| ***F02D 41/22*** | (2006.01) |
| ***F02B 39/10*** | (2006.01) |
| ***F02D 41/04*** | (2006.01) |
| ***G07C 5/08*** | (2006.01) |
| ***F02D 41/00*** | (2006.01) |
| ***F02D 41/14*** | (2006.01) |

(52) U.S. Cl.

CPC .............. *F02D 41/22* (2013.01); *F02B 39/10* (2013.01); *F02D 41/0007* (2013.01); *F02D 41/042* (2013.01); *F02D 41/1448* (2013.01); *G01M 15/04* (2013.01); *G07C 5/0816* (2013.01)

(58) Field of Classification Search

CPC .............................. G01M 15/02; G01M 15/04
USPC ............................. 73/114.69, 114.76, 114.77
See application file for complete search history.

(56) References Cited

U.S. PATENT DOCUMENTS

| | | | | |
|---|---|---|---|---|
| 4,882,905 | A * | 11/1989 | Kawamura | F02B 37/10 60/608 |
| 6,688,104 | B2 | 2/2004 | Baeuerle et al. | |
| 9,097,245 | B2 | 8/2015 | Knoblauch-Xander et al. | |
| 2011/0129333 | A1* | 6/2011 | Andonov | F02D 41/0007 415/117 |
| 2017/0058840 | A1* | 3/2017 | Wu | F02B 37/004 |
| 2019/0178190 | A1* | 6/2019 | Dudar | F02M 25/0836 |
| 2019/0242296 | A1* | 8/2019 | Zhang | F02D 41/064 |
| 2019/0249618 | A1* | 8/2019 | Dudar | F02D 41/18 |
| 2019/0368431 | A1* | 12/2019 | Dudar | F02D 41/003 |

OTHER PUBLICATIONS

Xiao, B. et al., "Diagnosing an Air Filter With an Electric Boosting Device," U.S. Appl. No. 15/683,431, filed Aug. 22, 2017, 44 pages.
Dudar, A., "Systems and Methods for Turbo Wastegate Diagnostics," U.S. Appl. No. 15/831,634, filed Dec. 5, 2017, 89 pages.

* cited by examiner

*Primary Examiner* — Eric S. McCall
(74) *Attorney, Agent, or Firm* — Geoffrey Brumbaugh; McCoy Russell LLP

(57) ABSTRACT

Methods and systems are provided for diagnosing a source of degradation in an exhaust system of a vehicle. In one example, a method may include actuating an electric turbocharger to rotate in a first direction to evaluate integrity of an exhaust pipe of the exhaust system and rotation the turbocharger in a second direction to assess an exhaust manifold of the exhaust system, after an engine of the vehicle is turned off. Pressures generated in the exhaust system are compared to thresholds based on barometric pressure and/or turbocharger speed.

20 Claims, 8 Drawing Sheets

ROM
CPU
RAM
KAM
I/O
DRIVER
DRIVER
FUEL SYSTEM
IGNITION SYSTEM
TRANSMISSION
BATTERY
M/G
PP
MAF
TP
MAP
PIP
EGO
ECT
SA
FPW-1
FPW-2
5
7
8
10
12
14
52
54
55
56
58
106
108
110
112
114
116
118
120
122
124
128
130
132
134
136
138
140
142
144
146
148
150
152
154
156
158
160
162
164
166
168
170
171
174
175
176
177
178
179
180
181
182
184
185
190
192

DETECTION OF LEAKS AND BLOCKAGES IN A VEHICLE EXHAUST SYSTEM

FIELD

The present description relates generally to methods and systems for detecting leaks and/or blockages in a vehicle exhaust system.

BACKGROUND/SUMMARY

Combustion of air-fuel mixtures at the cylinders of a vehicle engine generates torque to power a propulsion of the vehicle. The process of combustion produces exhaust gas that is evolved at the cylinders and channeled into an exhaust management system of the vehicle. The exhaust gas may be composed of a mixture of by-products including nitrogen oxides ($NO_x$), carbon monoxide (CO), hydrocarbons, and particulate matter. Release of such materials into the atmosphere is undesirable and current exhaust management systems are configured to remove these chemicals from the exhaust gas prior to emission.

Treatment of exhaust gas may include removal of $NO_x$, CO, and hydrocarbons by one or more three-way catalytic converters (TWCs) and particulate matter by a gas particulate filter (GPFs), where both devices are positioned between an exhaust manifold of the engine and an outlet of an exhaust pipe of the vehicle. The TWC and GPF are effective systems for removal of combustion by-products but may become degraded over time. For example, components of the exhaust system that are frequently exposed to outdoor elements, such as the TWC housing and the exhaust pipe, and temperature changes, such as the exhaust manifold, may rust or crack, leading to leakage of untreated exhaust gas. In addition, accumulation of particulate matter in gas flow pathways of the exhaust system may occur, resulting in blockages that degrade engine performance due to back pressure in the exhaust system. Thus, methods to diagnose leaks and blockages in the exhaust system soon after the leaks and blockages are formed may allow the system to be repaired before degradation increases and adversely affects engine performance.

Attempts to address detection of degradation to the exhaust system include operating an electrical supercharger to diagnose vehicle components. One example approach is shown by Bauerle et al. in U.S. Pat. No. 6,688,104. Therein, an electrical supercharger is activated after a vehicle is stopped and diagnostic methods to assess an intake manifold and an exhaust system of the vehicle are conducted. For example, an exhaust gas recirculation (EGR) valve operation may be evaluated based on measured changes in pressure or correct functioning of an exhaust temperature sensor may be determined by comparing a temperature signal to a pre-set reduction in temperature resulting from a cooling effect of the active electrical supercharger.

However, the inventors herein have recognized potential issues with such systems. As one example, the method of U.S. Pat. No. 6,688,104 does not include monitoring the exhaust system for leaks or blockages. Degradation of specific exhaust components such as the EGR valve or exhaust temperature sensor may not be indicative of leak formation in the exhaust manifold. If the diagnosed parts are deemed to be in satisfactory condition in spite of the presence of a source of degradation, operation of the vehicle may proceed with the leak or blockage unnoticed until degradation of other exhaust system elements or decreased engine performance occurs.

In one example, the issues described above may be addressed by a method for, upon engine shutdown, operating an electric turbocharger to draw air into an exhaust system and indicating degradation of the exhaust system based on a comparison of a pressure in the exhaust system measured during operating the electric turbocharger to a threshold pressure that is based on a barometric pressure. In this way, leaks and blockages in an exhaust system may be detected using elements already present in a vehicle engine system.

As one example, a throttle and one or more cylinder valves may be closed to create a closed system upstream of a turbine of an electric turbocharger. The electric turbocharger may be actuated after the engine is turned off and spun in a direction opposite of a direction when the turbocharger is operated when the engine is on (e.g., a reverse direction). The reverse spinning of the turbine may pull air, in reverse through an exhaust passage and into the exhaust manifold. A comparison of the pressure in the exhaust manifold, while running the turbocharger in reverse, to a threshold pressure that is determined based on barometric pressure is conducted to determine if a leak is present. In another example, the electric turbocharger may be spun in a forward direction, opposite of the reverse direction, with the engine off and throttle and the intake and exhaust valves of the cylinders in open positions to allow airflow through the cylinders and into the exhaust system. An exhaust tuning valve in an exhaust pipe may be closed to restrict air flow out of the exhaust pipe, allowing pressure to accumulate when air is pumped into the exhaust pipe, from upstream to downstream of the turbine. Pressures in the exhaust pipe and exhaust manifold may be measured and compared to a set of thresholds calculated as functions of barometric pressure to determine if the exhaust system is degraded.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
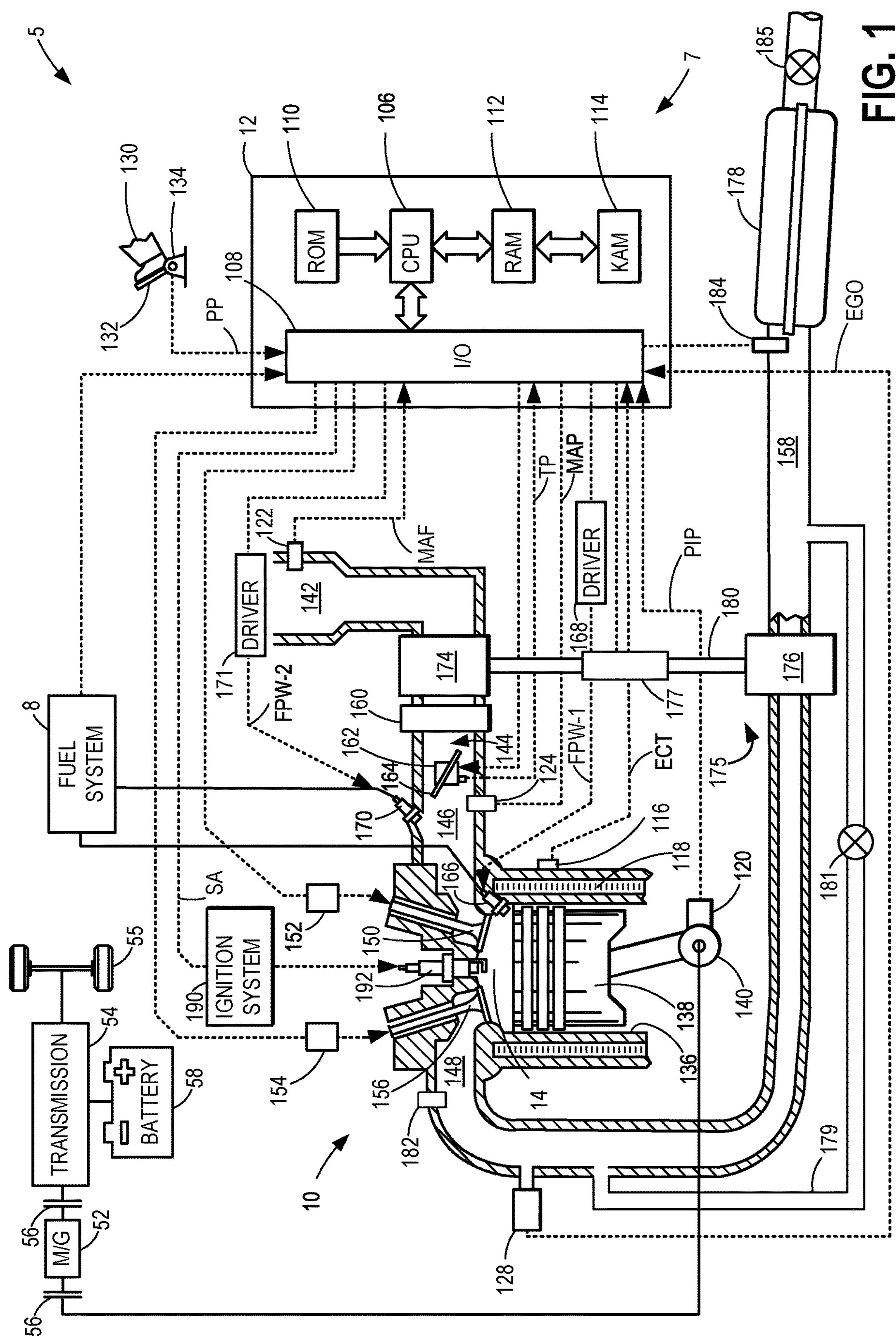
FIG. 1 is a schematic example of an engine system of a vehicle.
Figure 2A:
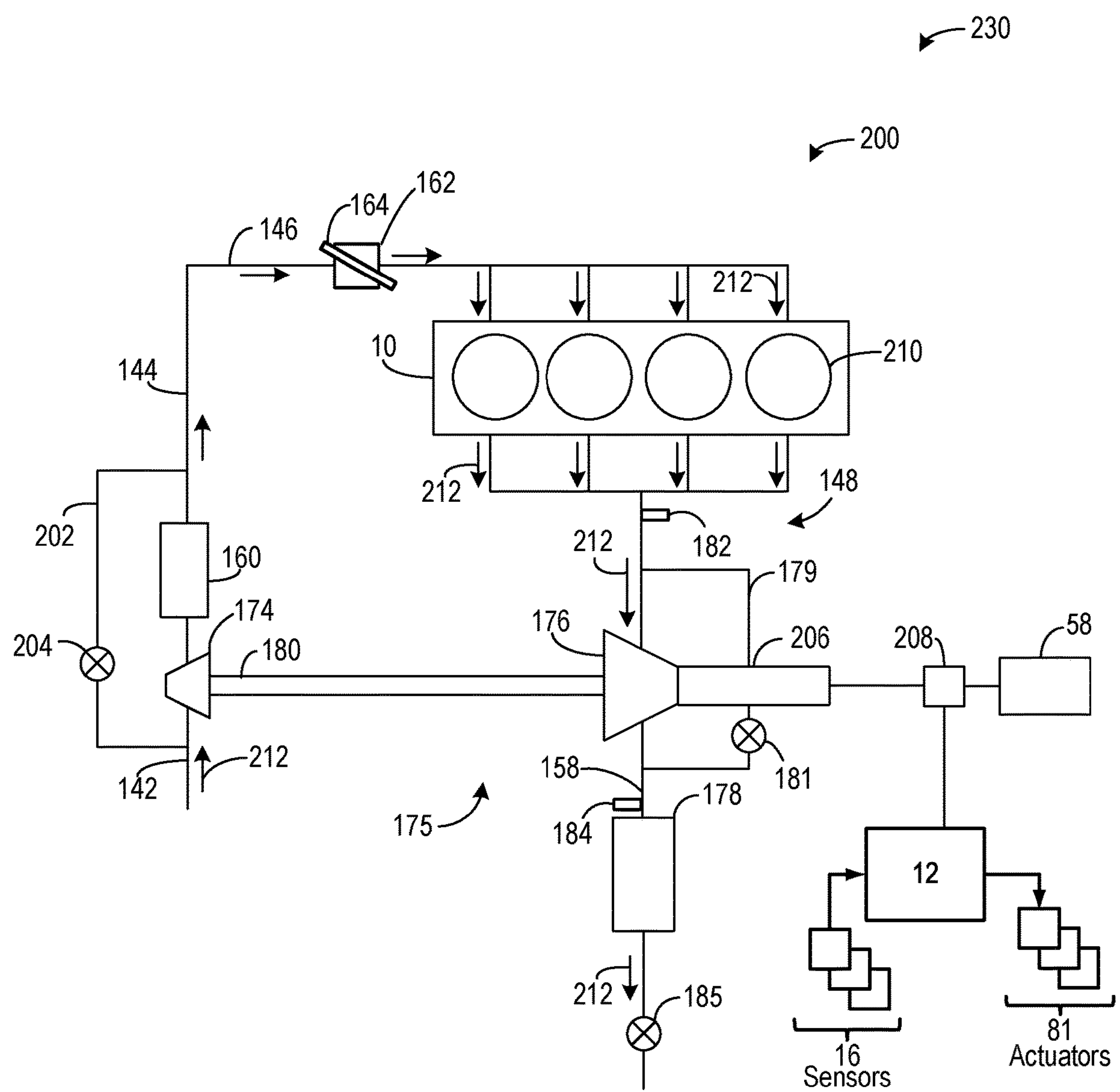
FIG. 2A shows forward spinning operations of an electric turbocharger of an engine system during an engine off condition.
Figure 3:
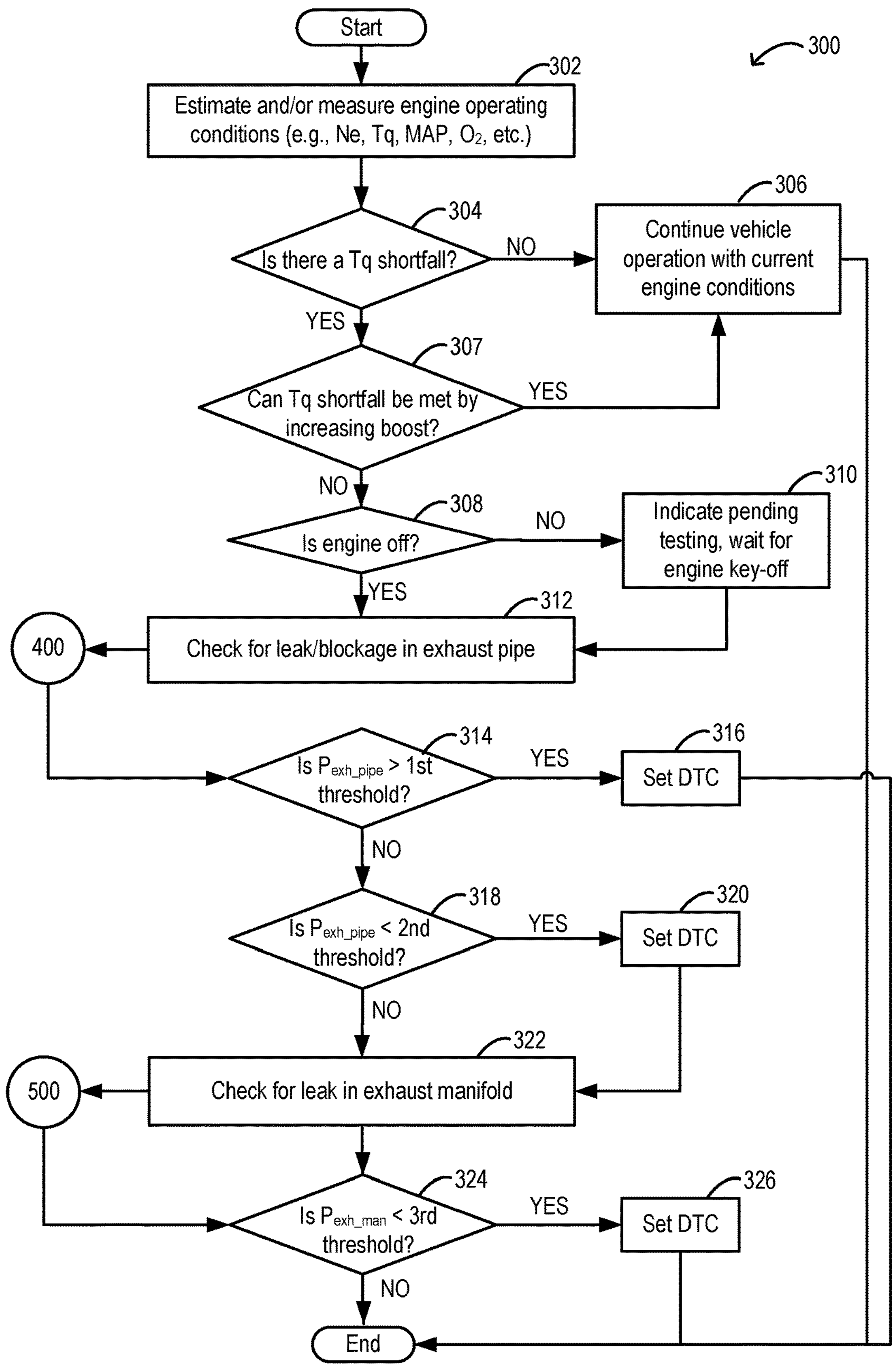
FIG. 3 shows a high-level flow chart of a routine for diagnosing leaks and blockages in an exhaust system of a vehicle.
Figure 4:
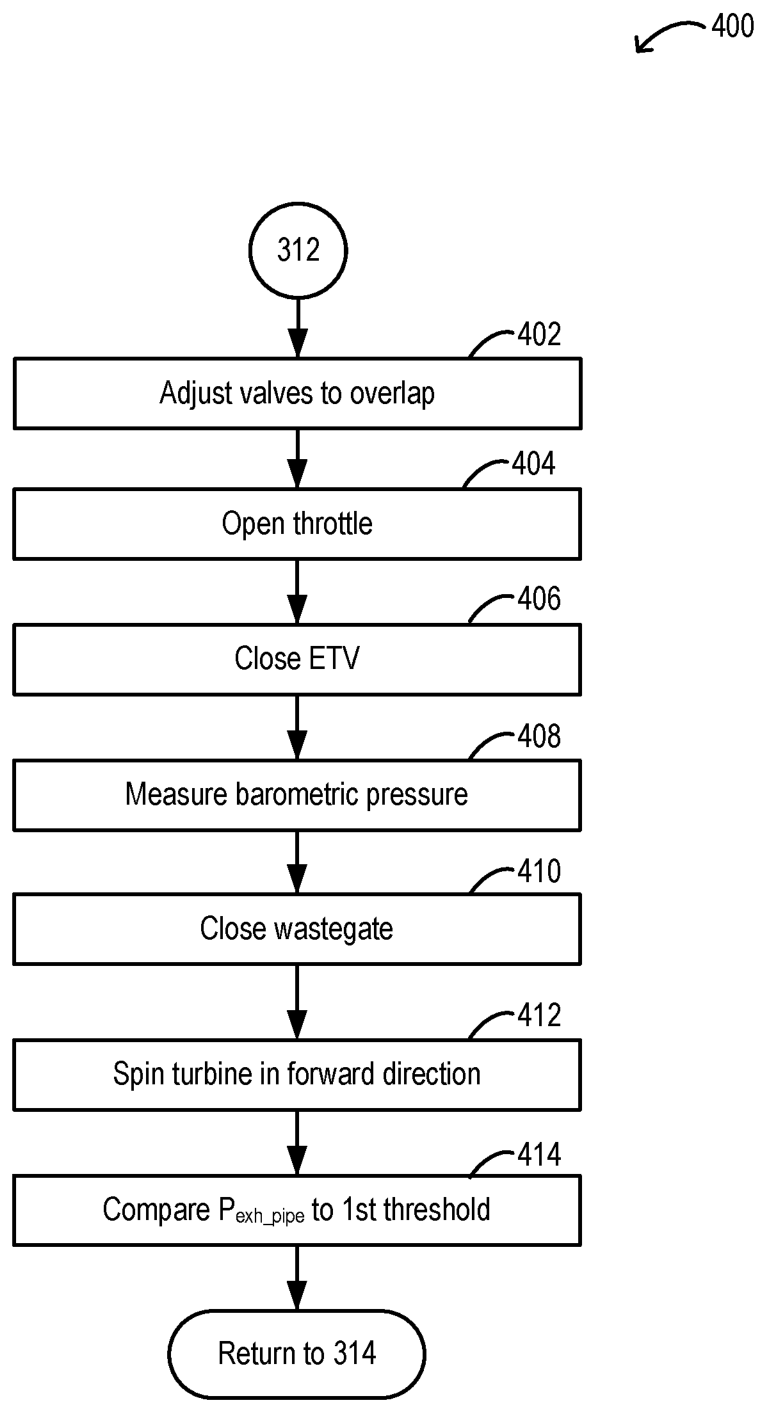
FIG. 4 shows a flow chart of an example routine for detecting leaks and blockages in an exhaust pipe of a vehicle.
Figure 5:
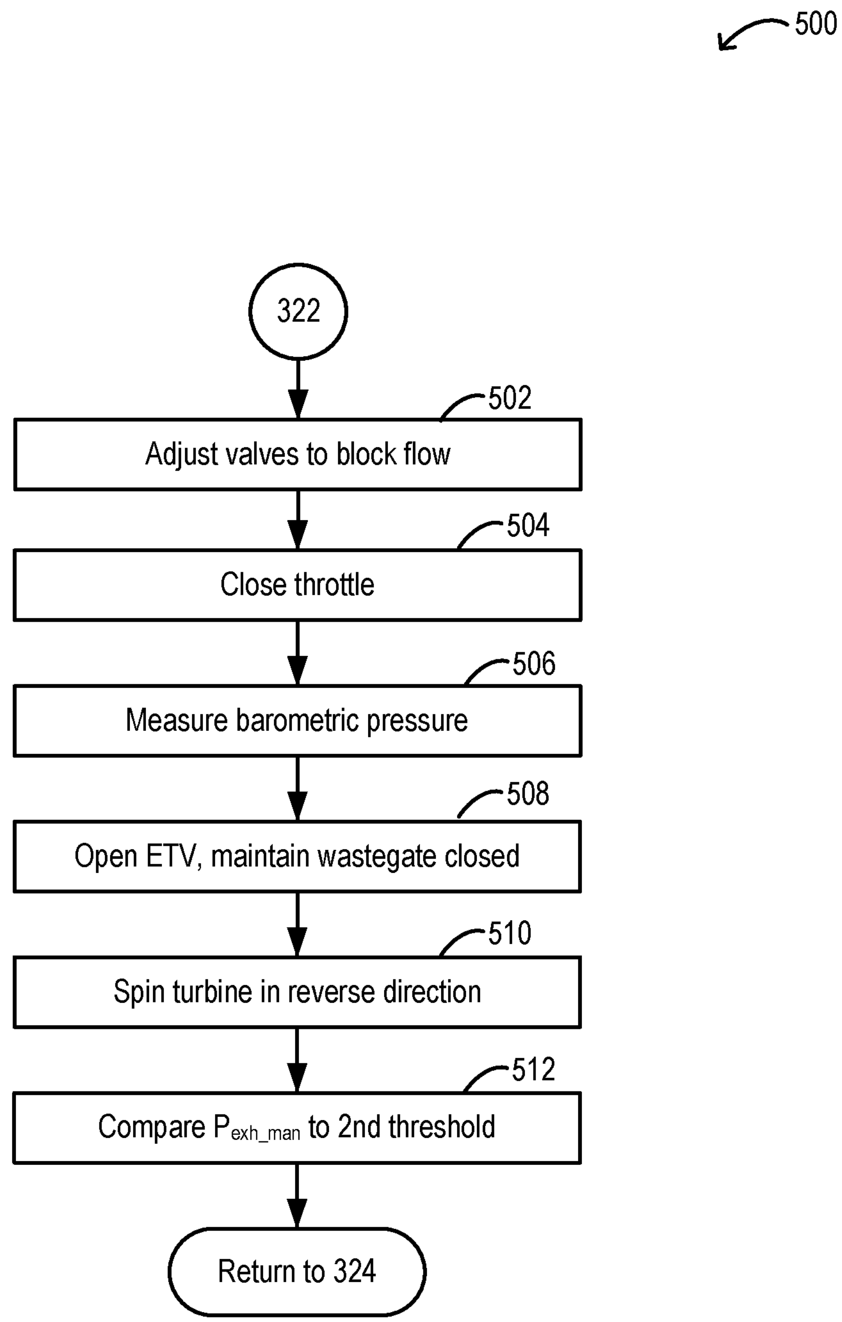
FIG. 5 shows a flow chart of an example routine for detecting leaks in an exhaust manifold of a vehicle.
Figure 6:
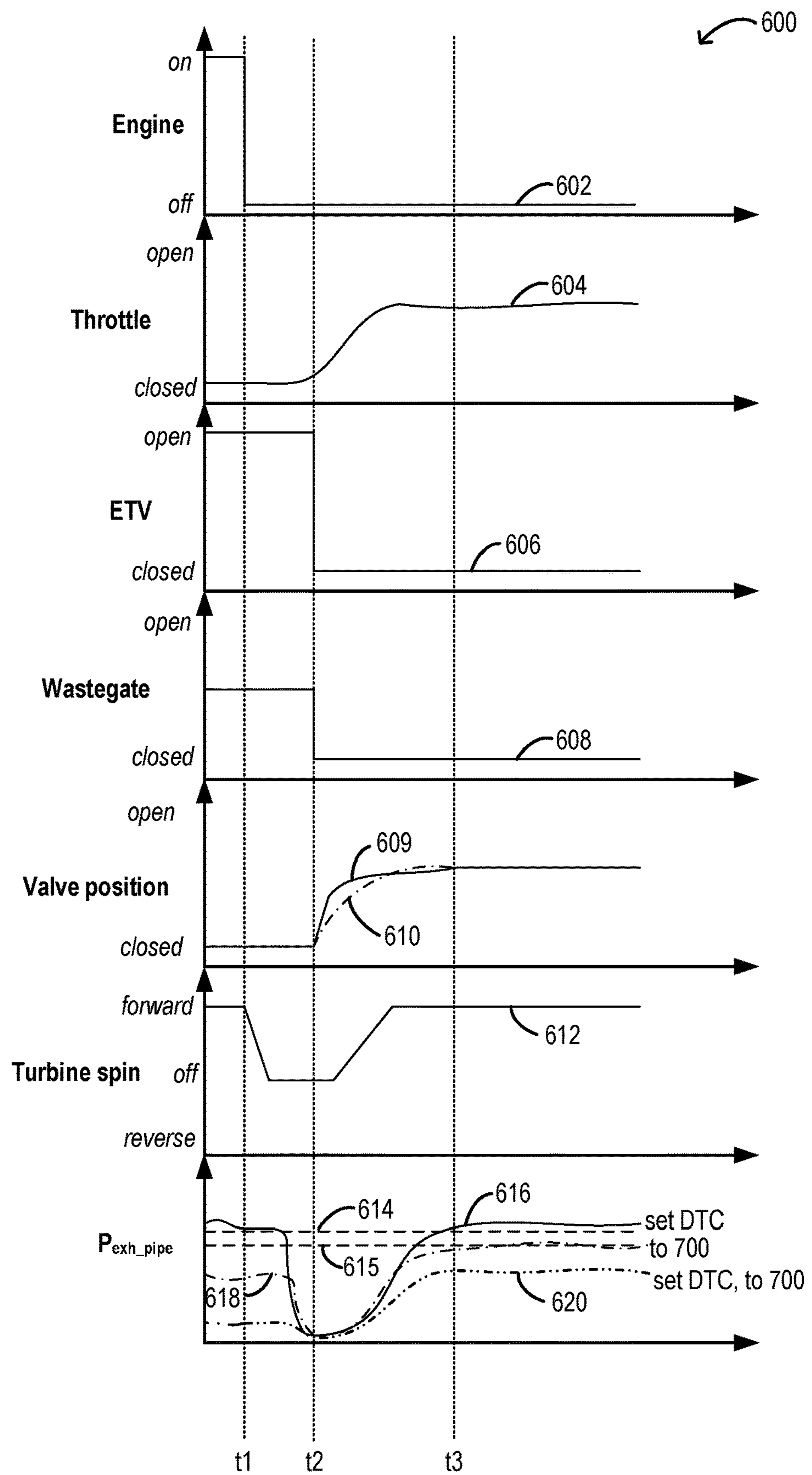
FIG. 6 shows an example operation map for detecting leaks and blockages in an exhaust pipe of a vehicle.
Figure 7:
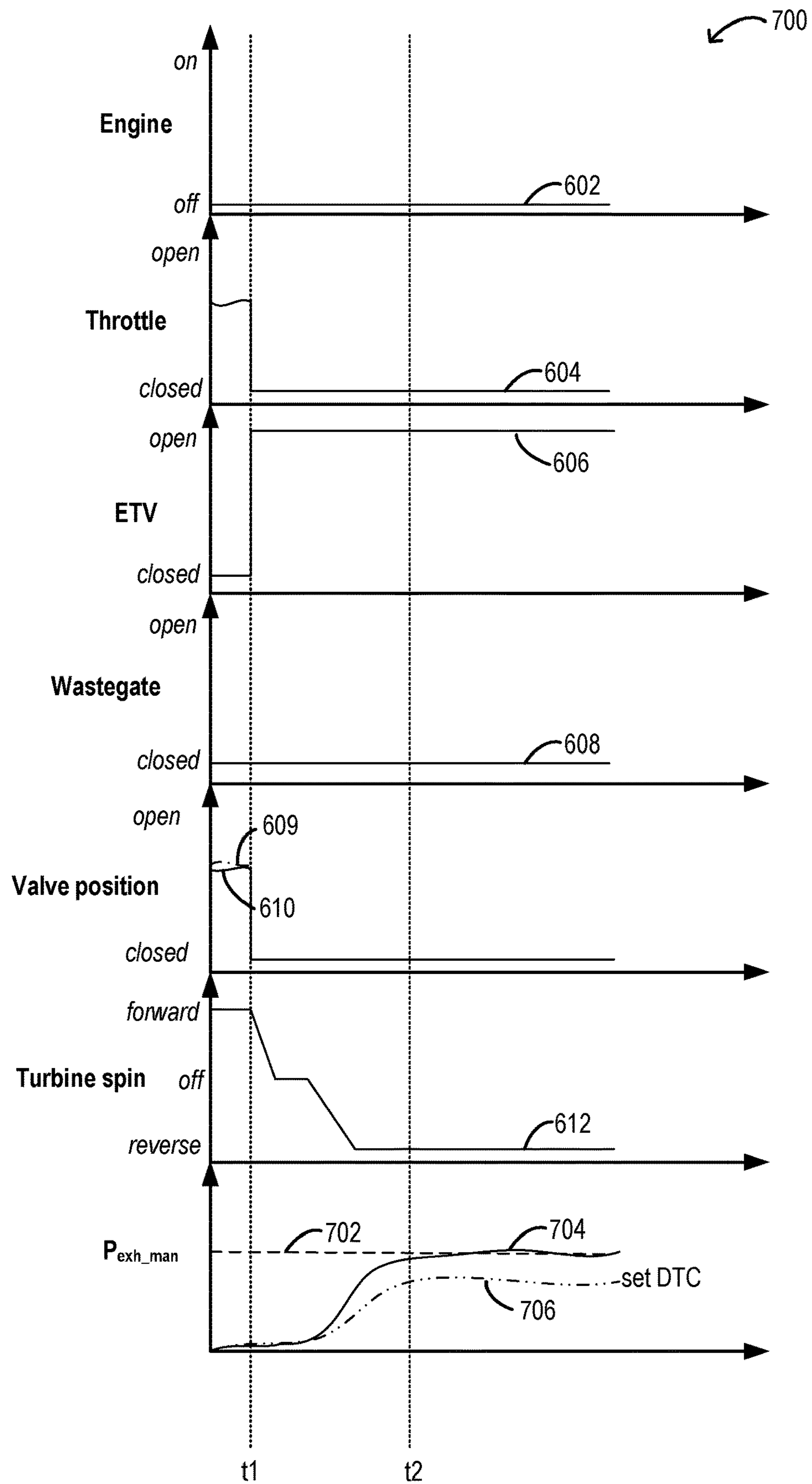
FIG. 7 shows an example operation map for detecting leaks in an exhaust manifold of a vehicle.

The following description relates to systems and methods for diagnosing leaks and blockages in an exhaust system of a vehicle. The vehicle may comprise an engine system with an engine coupled to an exhaust system and an electric turbocharger, as shown in FIG. 1. When the engine is turned off, the electric turbocharger may be activated to spin in a first, forward direction, to force air into an exhaust pipe from an intake passage of the engine system, as shown in FIG. 2A, arranged downstream of a turbocharger turbine. The electric turbocharger may also be spun in a second, reverse direction when the engine is off to pump air into an exhaust manifold of the engine, located upstream of the turbine, from an exhaust pipe of the vehicle. Spinning the electric turbocharger in the first or second direction while the engine is off may be included in example routines for determining if leaks or blockages are present in the exhaust system, as shown in FIG. 3. Upon diagnosis of degradation to the exhaust system, a leak or blockage in the exhaust pipe may be determined by a routine executable by an engine controller, as depicted in FIG. 4. Similarly, the engine controller may conduct a routine, as shown in FIG. 5, to detect a presence of a leak in the exhaust manifold. FIGS. 6 and 7 shows example operations for the detection of a leak or blockage in the exhaust pipe and a leak in the exhaust manifold, respectively.

Figure 2B:
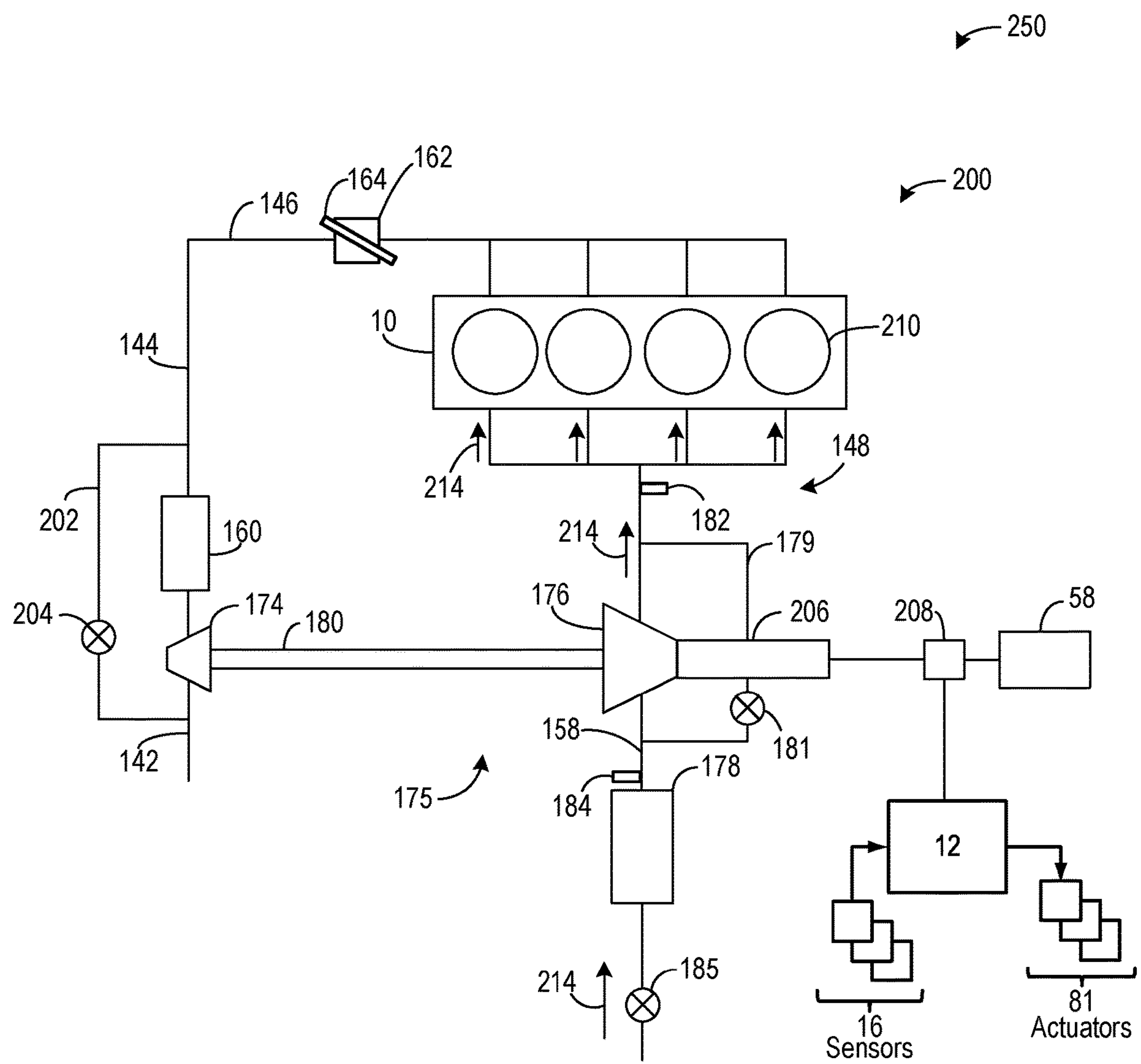
FIG. 2B shows reverse spinning operations of an electric turbocharger of an engine system during an engine off condition.

FIGS. 1, 2A, and 2B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

A vehicle may include an engine system comprising an engine coupled between an intake system and an exhaust system and an electric turbocharger including a compressor arranged in the intake system and a turbine arranged in the exhaust system. The engine includes an intake manifold coupled with a remainder of the intake system and an exhaust manifold coupled with a remainder of the exhaust system. Additionally, the exhaust system may include an exhaust pipe adapted to expel combusted gas from the engine system, downstream of the turbocharger turbine. An example of a vehicle with such components is shown in FIG. 1. FIG. 1 depicts an example of a cylinder of internal combustion engine 10 included by engine system 7 of vehicle 5. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. FIG. 1 shows engine 10 configured with an electric turbocharger 175 including a compressor 174 arranged between intake passages 142 and 144, and an exhaust turbine 176 arranged along the exhaust system between exhaust manifold 148 and exhaust pipe 158. In some examples, compressor 174 may be adapted with a compressor recirculation passage 202, as shown in FIGS. 2A-2B, which recirculates compressed air from downstream of compressor 174 and a charge air cooler 160 to upstream of compressor 174. Flow through compressor recirculation passage 202 may be controlled by adjusting an opening of a continuously variable compressor recirculation valve (CCRV) 204. CCRV 204 may be a continuously variable valve and increasing the opening of the CCRV 204 may include actuating (or energizing) a motor or solenoid to open the valve. In some embodiments, CCRV 204 may be partially open during boosted engine operation to provide a surge margin and the opening of the CCRV 204 may be increased in response to an indication of surge.

Compressor 174 may be at least partially powered by exhaust turbine 176 via a shaft 180. In one example, shown in FIG. 1, electric motor 177 is also coupled to shaft 180 and may also rotate compressor 174 when it is supplied with electrical power via an energy recovery system, such as battery 58. During events where a likelihood of turbo lag is increased, such as immediately after engine start-up or an increase in torque demand after a period of idling, exhaust turbine 176 may not spin fast enough due to an insufficient amount of exhaust gas to power the rotation of exhaust turbine 176. Thus, controller 12 may command electric motor 177 to rotate compressor 174 to compress air entering engine 10. A speed of compressor 174 may be regulated by electric motor 177 and/or wastegate 181, arranged in an exhaust system of the engine system 7.

In another example, electric motor 177 may be directly coupled to turbine 176, as shown in FIGS. 2A-2B. Power is similarly supplied to electric motor 177 by battery 58 and an amount of power commanded by controller 12. Rotation of turbine 176 by electric motor 177 may also result in rotation of compressor 174 due to mechanical coupling by shaft 180. Thus, if turbine 176 rotates in a first direction, compressor 174 may spin in the first direction at a similar speed. If the turbine 176 spins in a second, opposite direction, the compressor 174 may spin in the second direction. Herein, the first direction may refer to a forward direction and the second direction may refer to a reverse direction. The first direction may include the compressor 174 flowing boosted air from the compressor, to the engine 10, thereby increasing a manifold absolute pressure (MAP). The second direction may include pumping air from the exhaust pipe 158 to the exhaust manifold 148, such that pressure in the exhaust manifold 148 increases if flow through cylinder 14 is blocked. The direction and speed of rotation may be initiated by the electric motor 177 and turbo lag may be mitigated by electrically powering turbine 176 until exhaust pressure has accumulated sufficiently to spin turbine 176 at a desired speed.

Wastegate 181 may be opened via controller 12 to allow exhaust gases to bypass turbine 176 via bypass passage 179. Controller may increase compressor speed by increasing an electric current supplied to electric motor 177 and/or closing wastegate 181. Conversely, compressor speed may be decreased by reducing the electric current and/or opening wastegate 181. When exhaust gas pressure increases enough to spin turbine 176 at a speed that meets the boost demand, electric motor 177 may be deactivated and compressor 174 driven exclusively by mechanical coupling with turbine 176 via shaft 180.

A charge air cooler (CAC) 160 may be positioned in intake passage 142 downstream of compressor 174 and upstream of a throttle 162. The CAC 160 may be an air-to-air CAC or a liquid-cooled CAC, configured to cool and increase a density of air compressed by the compressor 174. The cooled air may be delivered to the engine 10 and combusted at cylinder 14.

Throttle 162, including a throttle plate 164, may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Herein, operation of intake valve 150 may be described in greater detail. For example, the intake valve 150 may be moved from a fully open position to a fully closed position, or to any position therebetween. For all conditions being equal (e.g., throttle position, vehicle speed, pressure, etc.), the fully open position allows more air from the intake passage 146 to enter the cylinder 14 than any other position of the intake valve 150. Conversely, the fully closed position may prevent and/or allow the least amount of air from the intake passage 146 to enter the cylinder 14 than any other position of the intake valve 150. Thus, the positions between the fully open and fully closed position may allow varying amounts of air to flow between the intake passage 146 to the cylinder 14. In one example, moving the intake valve 150 to a more open position allows more air to flow from the intake passage 146 to the cylinder 14 that its initial position.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

As the mixture of intake air and fuel is combusted at cylinder 14, exhaust valve 156 may be commanded to open and flow exhaust gas from cylinder 14 to exhaust manifold 148. The opening of the exhaust valve 156 may be timed to open before intake valve 150 is fully closed so that there is a period of overlap when both valves are at least partially open. The overlap may generate a weak vacuum that accelerates the air-fuel mixture into the cylinder, e.g., exhaust scavenging. The period of valve overlap may be timed in response to engine speed, camshaft valve timing, and configuration of the exhaust system. Exhaust manifold 148 can receive exhaust gases from other cylinders of engine 10 in addition to cylinder 14. The exhaust gas channeled from cylinder 14 to exhaust manifold 148 may flow to turbine 176 or bypass turbine 176 via bypass passage 179 and wastegate 181.

Exhaust gas that is directed to turbine 176 may drive the rotation of turbine 176 when wastegate 181 is closed, thereby spinning compressor 174 when compressor 174 is not spun by electric motor 177. Alternatively, when wastegate 181 is at least partially open, e.g., adjusted to a position between fully closed and fully open, or fully open, a portion of the exhaust gas may be diverted around turbine 176 through bypass passage 179. Shunting exhaust flow through bypass passage 179 may decrease the rotation of turbine 176, thereby reducing the amount of boost provided to intake air in intake passage 142 by compressor 174. Thus during events where a rapid decrease in boost is desired, e.g., an tip-out at input device 132, turbine 176 may be decelerated by opening wastegate 181 and reducing the amount of exhaust gas directed to turbine 176.

Wastegate 181 is disposed in bypass passage 179 which couples exhaust manifold 148, downstream exhaust gas sensor 128, to an exhaust pipe 158, between turbine 176 and emission control device 178. Spent exhaust gas from turbine 176 and exhaust gas routed through bypass passage 181 may convene in exhaust pipe 158 upstream of emission control device 178 before catalytic treatment at emission control device 178.

Exhaust gas sensor 128 is shown coupled to exhaust manifold 148 upstream of turbine 176 and a junction between bypass passage 179 and exhaust manifold 148. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example, before treatment at emission control device 178. Emission control device 178 may be a three way catalyst (TWC), NOx trap, various other emission control devices, or combinations thereof, configured to remove undesirable chemicals from the exhaust gas prior to atmospheric release.

Emission control device (ECD) 178 may also include a gasoline particulate filter (GPF) for removing particulate matter such as soot from the exhaust gas. In one example, as shown in FIG. 1, the GPF may be integrated into ECD 178 so that the GPF is arranged downstream of the TWC, enclosed within an outer housing of ECD 178, and functioning as a final treatment stage in ECD 178. In other examples, the GPF may be integrated into ECD 178 upstream of the TWC, or configured as a separate component upstream or downstream of ECD 178.

Exhaust pipe 158 may also include an exhaust tuning valve (ETV) 185, arranged downstream of ECD 178. The ETV 185 may restrict flow out of the exhaust pipe 158 when an opening of the ETV 185 is decreased, thereby increasing back pressure in the exhaust pipe 158. During engine operation, the ETV 185 may be fully opened to allow maximum flow through the exhaust pipe 158. When in a fully closed position, the ETV 815 may not block flow through the exhaust pipe 158 but instead reduce flow sufficiently to allow pressure to accumulate in the exhaust system. The ETV may be closed during low flow engine operations to provide noise attenuation in areas near residents and pedestrians, and be opened at higher flows for increased power and fuel economy from less pressure restriction. Optionally, the ETV may be maintained open for improved performance at a track, or alternatively maintained closed under most vehicle operations for maximum noise attenuation.

The valves described above and other actuatable components of vehicle 5 may be controlled by controller 12. Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors 16, as shown in FIGS. 2A-2B, coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Exhaust manifold pressure may be measured by a pressure sensor 182 and pressure in the exhaust pipe 158 measured by another pressure sensor 184. Controller 12 may infer an engine temperature based on an engine coolant temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from an energy storage device 58 (herein, battery 58) to provide torque to vehicle wheels 55. Electric machine 52 may also be operated as a generator to provide electrical power to charge battery 58, for example during a braking operation. In some examples, the electric machine 52 may be coupled to the turbine 176, as will be described in greater detail below.

The controller 12 receives signals from the various sensors of FIG. 1 and employs the various actuators of FIG. 1, depicted in FIGS. 2A-2B by sensors 16 and actuators 81 (as described further below), to adjust engine operation based on the received signals and instructions stored on a memory of the controller. For example, adjusting a rotational speed and direction of the turbine 176 may include adjusting a signal provided to an actuator, such as actuator 208 of FIGS. 2A-2B, of the turbine 176 sent by the controller 12. In some examples, the rotational speed of the turbine 176 is adjusted in response to one or more of a cold-start and pressures of the intake and exhaust passages. Thus, the turbine 176, and therefore the compressor 174, may be rotated in forward and reverse directions, wherein the forward direction results in boost flowing to the engine 10 and where the reverse direction results in increased exhaust backpressure and manifold pressure decreasing.

Elements included in an exhaust system of a vehicle may affect a fuel efficiency and power output of an engine. Furthermore, the exhaust system may remove undesirable constituents of exhaust gas, such as CO, $NO_x$, hydrocarbons, and particulate matter by channeling the exhaust gas through an after treatment device before releasing the gas to the atmosphere. Formation of blockages in an exhaust pipe (e.g., passage) of the exhaust system may result in increased exhaust backpressure, decreasing engine performance. Prolonged and excessive accumulation of debris clogging passageways of the exhaust system may lead to engine backfire. In addition, undetected leakages in the exhaust system may release undesirable chemicals to the atmosphere and also degrade combustion efficiency. For example, in vehicles with exhaust gas recirculation (EGR), fuel injection and spark timing may be calculated based on an expected amount of exhaust gas recirculated to an intake manifold of the engine. A leak in the exhaust system may decrease a flow of EGR, causing the air-to-fuel ratio at combustion chambers of the engine to deviate from stoichiometry. Thus, a method to regularly and efficiently diagnose the exhaust system for leaks and blockages may address the issues described above.

A system for diagnosing leaks and blockages in an exhaust system of an engine system 200 is illustrated in FIGS. 2A and 2B. Specifically, FIG. 2A illustrates a first embodiment 230 for operating the engine system 200 to detect a leak or blockage in an exhaust pipe of the engine system 200, downstream of the turbine, and FIG. 2B illustrates a second embodiment 250 for operating the engine system 200 to detect a leak in an exhaust manifold of the exhaust system 200. Components in common with those of FIG. 1 are similarly numbered and will not be re-introduced. The turbocharger 175 is illustrated as an electric turbocharger wherein the turbine 176 is directly coupled to an electric motor 206 configured to power (e.g., drive rotation of) the turbine 176 when receiving power from battery 58. It will be appreciated that the electric motor 206 may be used similarly to electric motor 177 of FIG. 1 without departing from the scope of the present disclosure. Power supply from battery 58 to the electric motor 206 may be adjusted via a power actuator 208. The controller 12 may signal to the power actuator 208 when and how much power to direct from the battery 58 to the electric motor 206. By sending power to the electric motor 206, the turbine 176 may spin and/or rotate in a particular direction. Specifically, the power actuator 208 may be adapted to actuate the motor 206 to spin in each of a forward and a reverse direction, thereby rotating the turbine 176 in the forward and reverse direction, based on control signals received from the controller 12.

As described above for FIG. 1, rotation of the turbine 176 may result in similar rotation of the compressor 174 due to the shaft 180 mechanically coupled therebetween. The turbine 176 may spin in the first, or forward direction, directing gas flow through the engine cylinders, through the turbine 16, and to the exhaust pipe 158 and causing the pressure in the exhaust pipe 158 to increase when the ETV 185 is closed. In contrast, rotation of the turbine 176 in the second, reverse direction draws air into the exhaust system through the exhaust pipe 158 and to the exhaust manifold 148, thereby increasing the pressure in the exhaust manifold 148 when there is no valve overlap between the cylinder intake and exhaust valves (such that air does not flow from the exhaust manifold to the intake manifold via the cylinders). Flow is channeled entirely through the turbine 176 when wastegate 181 is closed, whereas when wastegate 181 is at least partially open, a portion of the flow may be diverted from the turbine 176 and through the bypass 179.

Turning now to FIG. 2A, the first embodiment 230 for operating the electric turbocharger 175 to detect degradation in the exhaust pipe 158, downstream of the turbine 176, by spinning the turbine 176 in the first direction (e.g., forward direction) is shown. The engine may be turned off and a period of time allowed to elapse for engine components, such as a crankshaft, to stop spinning. The controller 12 may adjust the rotation of the crankshaft so that the final crankshaft position results in the intake valves and exhaust valves of a plurality of cylinders 210, which may each be cylinder 14 of FIG. 1, overlapping so that intake passage 146 is fluidly coupled to exhaust manifold 148 via the plurality of cylinders 210. In other words, both the intake valves and exhaust valves may be partially open so that air may flow from the intake passage 146, to the exhaust manifold 148, via the plurality of cylinders 210. The throttle 162 may be adjusted to an at least partially open position and the ETV 185 closed to restrict flow out of the exhaust pipe 158. The barometric pressure may be measured by the pressure sensor 182 in the exhaust manifold 148 when the engine is stationary and the valves of the plurality of cylinders 210 adjusted to be open to gas flow. The controller 12 may also command the wastegate 181 in the bypass passage 179 to close.

The turbine 176 is rotated in the first direction by the electric motor 206, pulling air into the intake passages 142, 144, 146, through the throttle 162 and cylinders 30, and to the exhaust manifold 148, as indicated by arrows 212. A speed of a turbine 176 may be accelerated and maintained at a pre-set speed. Air passing through the cylinders 210 flows into the exhaust system, building pressure in the exhaust system due to the flow restriction imposed by the closing of the ETV 185. The spinning of the turbine 176 may stabilize after a brief period of time, such as two seconds. After the spinning has stabilized, the pressure in the exhaust pipe 158 may be measured by the pressure sensor 184, arranged immediately upstream of the ECD 178. In other embodiments, pressure sensor 184 may be positioned inside or integrated into the ECD 178. As one example, the pressure sensor 184 may be a pressure sensor of a particulate filter included as or as part of the ECD 178. Specifically, in one example, the pressure sensor 184 may be a gasoline particulate filter (GPF) gage pressure sensor adapted to measure a pressure of air in the exhaust pipe.

The measured pressure in the exhaust pipe 158, as determined by the output of the pressure sensor 184, may be compared to a first threshold pressure, which may be a function of the measured barometric pressure, to evaluate whether a leak or a blockage in the exhaust pipe 158 is present. For example, the first threshold may be an expected final pressure in the exhaust pipe based on a calculated rise in pressure upon actuation of the turbine in the first direction when the ETC 185 is closed. The increase in pressure relative to the barometric pressure as a starting value may be determined. Thus, a measured pressure in the exhaust pipe 158 that is higher than the first threshold may indicate that a blockage is present in the exhaust pipe 158 and impeding air flow more than expected by the closed ETV 158. A measured pressure in the exhaust pipe that is lower than a second threshold may indicate a leak is present in the exhaust pipe 158 and releasing pressure from the exhaust pipe 158. The second threshold may also be a function of the measured barometric pressure and may be a lower boundary of an expected pressure range of the exhaust pipe 158 for a blockage-free and leak-free system while the turbine is spinning in the first direction. If, however, the pressure in the exhaust pipe 158 matches the second threshold or is between the first and second thresholds, the exhaust pipe 158 may be deemed intact. If diagnosis of the exhaust system is initiated due to an indication that the exhaust system is degraded, the exhaust manifold may additionally be evaluated for a leak. Alternatively, if the controller is configured to diagnose the exhaust system as a routine check, the exhaust manifold may also be assessed.

The second embodiment 250 for operating the electric turbocharger 175, shown in FIG. 2B, may be used to detect a leak in the exhaust manifold 148, upstream of the turbine 176, by spinning the turbine 176 in the second direction (e.g., reverse direction). The engine may be turned off and allowed to come to a standstill. The controller 12 may adjust the crankshaft so that the intake valves and exhaust valves of the plurality of cylinders 210, which may each be cylinder 14 of FIG. 1, do not overlap. In other words, one of or both the intake valve or the exhaust valve is closed so that flow through the plurality of cylinders 210, between the intake and exhaust manifolds, is blocked. The throttle 162 may be adjusted to a fully closed position and the ETV 185 adjusted to an open position. The barometric pressure may be measured by the pressure sensor 182 in the exhaust manifold 148 when the engine is stationary and the intake and exhaust valves are closed to gas flow. The controller 12 may also command the wastegate 181 in the bypass passage 179 to close or maintain the wastegate 181 closed.

The turbine 176 is rotated by the electric motor 206 in the second direction at a fixed, pre-set speed, pumping air from the opening of the exhaust pipe 158, through the ECD 178 and turbine 176, into the exhaust manifold 148. Air flow through the exhaust system is indicated by arrows 214, travelling in an opposite direction with respect to exhaust gas flow during engine operation and terminating at the plurality of cylinders 210. The exhaust manifold pressure increases and the pressure is measured again by pressure sensor 182 after a period of time during which the spinning of the turbine 176 stabilizes. For example, the pressure may be measured a threshold duration after turbine rotation is initiated (e.g., two seconds, in one example). The measured pressure may be compared to a third threshold pressure to determine if a leak is present in the exhaust manifold 148.

Similar to the first threshold, the third threshold may be calculated as an expected pressure in the exhaust manifold 148 as function of the barometric pressure and turbine speed. A measured exhaust manifold pressure that is lower than the third threshold may indicate a leak in the exhaust manifold 148. If the measured pressure in the exhaust manifold 148 is equal to the third threshold, the exhaust manifold 148 may be deemed leak-free. It may be noted that development of a blockage in the exhaust manifold 148 is unlikely due to higher flow rates through the exhaust manifold 148 versus the exhaust pipe 158 during engine operation, thus diagnosis of the exhaust manifold 148 for blockages is not described. However, in other examples, rotating the turbine 176 in the second direction may be similarly used to detect blockages in the exhaust manifold 148.

In one embodiment, the operations described above for FIGS. 2A-2B may be used every time the engine is turned off as a relatively fast and convenient method to diagnose the exhaust system for leaks and blockages without adding parts or controls to the engine system, during engine operation. Once engine key-off occurs, the method may be initiated after a period of time elapses to allow engine components, such as the crankshaft, to become stationary and/or pressures in the exhaust system to stabilize. Furthermore, the methods for detecting leaks upstream of the turbine 176 and leaks and blockages downstream of the turbine 176 may be employed independently, if a region of the exhaust system, e.g., the exhaust manifold 148 or the exhaust pipe 158, has been identified as intact. The methods may also be used cooperatively as a set of regular diagnostic operations or if degradation is suspected and location of the leak or blockage is desired.

For example, after the engine is turned off and the crankshaft is stationary, the turbine 176 may be rotated in the first direction to determine if a leak or blockage is present in the exhaust pipe 158. The turbine 176 may then be rotated in the second direction to evaluate if a leak is present in the exhaust manifold 148. In one example, the exhaust pipe may be diagnosed first to confirm the present of a leak or blockage. The exhaust manifold may then be tested regardless of the results of the exhaust pipe test for leaks because the results of the exhaust pipe test may not rule out a leakage in the exhaust manifold. For example, if degradation in the exhaust system is detected and the exhaust pipe diagnosis confirms that the issue is not in the exhaust pipe, the exhaust manifold may be tested. However, if a leak is detected in the exhaust manifold, it is desirable to also test the exhaust manifold for a leak as both regions may have concurrent leaks.

In addition, if a blockage is detected in the exhaust pipe, it may not be useful to subsequently test for a leak in the exhaust manifold. Restricted flow through the exhaust pipe due to the blockage may decrease air flow into the exhaust manifold while the turbine is spinning in the second direction. Thus, pressure in the exhaust manifold may not increase as calculated and lead to a false positive, e.g., identification of a leak, upon diagnosis.

FIG. 3 shows a method 300 for diagnosing an engine system, including an engine coupled to an exhaust system, for leaks and blockages in the exhaust system. Method 300 may include determining whether there is a leak or blockage in an exhaust pipe of the exhaust system, the exhaust pipe arranged downstream of a turbine of an electric turbocharger, as depicted in routine 400 of FIG. 4 and/or determining whether there is a leak in an exhaust manifold of the exhaust system, the exhaust manifold arranged upstream of the turbine, as depicted in method 500 of FIG. 5. Methods 300, 400, and 500 may be initiated by the operator, for example, by turning on a switch or button to prompt a controller, such as controller 12 of FIGS. 1-2B, to initiate the routine. Alternatively, methods 300, 400, and 500 may be performed routinely and automatically, via the controller, every time the engine is turned off. The exhaust system may comprise an exhaust manifold, electric turbocharger turbine, and an exhaust pipe (such as the exhaust manifold 148, electric turbocharger 175, and exhaust pipe 158 of FIGS. 1-2B). The turbine of the electric turbocharger may be actuated by an electric motor, such as the turbine 176 of FIGS. 1-2B, and configured to spin in a first, forward direction, and a second, reverse direction (e.g., two different directions). An emissions control device (ECD) and an exhaust tuning valve (ETV) arranged downstream of the ECD, e.g., the ECD 178 and ETV 185 of FIGS. 2A-2B, may be positioned in line with the path of gas flow in the exhaust pipe. The ECD may be configured with an integrated gas particulate filter (GPF) in addition to a three-way catalyst. The ETV may be configured to remain fully open position during engine operation unless instructed to close. When closed, the ETV may be adapted to restrict gas flow through the tailpipe but not block flow. Instructions for carrying out methods 300, 400, 500 and the rest of the methods included herein may be executed by the controller, based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, the method includes estimating and/or measuring the operating conditions of the engine. These may include, for example, engine speed, engine torque, boost pressure, a manifold absolute pressure, barometric pressure, an exhaust manifold pressure measured by a pressure sensor such as pressure sensor 182 of FIGS. 1-2B, and oxygen content of exhaust gas detected by an exhaust gas sensor, such as exhaust gas sensor 128 of FIG. 1, etc. Other estimated or measured operating conditions may include positions of intake and exhaust valves at combustion chambers as determined by position sensors, a position of an exhaust wastegate, such as the wastegate 181 of FIGS. 2A-2B, and a position of the ETV.

The method may include determining at 304 whether the torque supplied by the engine meets a torque demand. The torque demand may be a driver-initiated torque demand indicated by a signal from an input device, such as the accelerator pedal 132 of FIG. 1. A shortfall in torque supply relative to the demand may indicate that more boost and thus higher boost pressure at the engine intake is desired. However, the comparison of torque supply to torque demand may also provide detection of a potential issue in engine performance due to degradation of a component in the engine system. For example, a leak in the exhaust system may result in the air-to-fuel ratio at the combustion chambers to deviate from stoichiometry. A blockage in the exhaust system may generate backpressure in the exhaust system and reduce a power output of the engine. If the torque supply is not less than the torque demand, e.g., the supply meets the demand, the method proceeds to 306 to continue vehicle operation with the current engine conditions. If a torque shortfall is detected, the method continues to 307 to determine if the shortfall may be met by increasing engine boost. Boost may be increased by closing (or decreasing an opening of) an exhaust wastegate, thereby directing exhaust gas from exhaust valves of all engine cylinders to the turbine. The increased flow of gas to the turbine increases a rotational speed of the turbine, resulting in an increase in compressor speed and boost pressure. If the operations described above to increase boost pressure provides sufficient torque to meet the torque demand, the method proceeds to 306 to continue vehicle operation with the current engine conditions (e.g., with the increased boost pressure supplied by the faster speed of the turbocharger). If increasing turbine flow does not compensate for the torque shortfall, the method continues to 308 to confirm if the engine is turned off.

If the engine is on, the method may activate an indicator at 310, such as an indicator light or signal on a dashboard of the vehicle, to notify an operator that the diagnosis for a leak in the exhaust manifold will be performed when the engine is deactivated. Alternatively, the method at 310 may include setting a diagnostic code in the controller so that once the engine is turned off, the controller may automatically initiate the leak detection routine described herein. Once engine key-off occurs, the method may proceed to 312. If the engine is already off, the method continues directly to 312 from 308 to evaluate a presence or absence of a source of degradation in the exhaust pipe of the exhaust system. The method 400 of FIG. 4 may be conducted to assess whether a leak or blockage is detected in the exhaust pipe.

Continuing to FIG. 4, at 402, the method 400 includes adjusting the intake and exhaust valves of each cylinder to overlap so that air may flow through the combustion chambers. Adjusting the positions of the valves may include the controller commanding an actuator of a crankshaft, which may drive rotation of a camshaft coupled to the intake and exhaust valves, to rotate until the intake valves and the exhaust valves are in an at least partially open position, e.g., a position between fully open and fully closed, or until the intake valves and exhaust valves are both fully open. In this way, air may pass between the intake manifold and exhaust manifold of the engine, via the open cylinder intake and exhaust valves. A throttle, such as throttle 162 of FIGS. 1-2B, in an intake passage upstream of the intake manifold is commanded to open at 404 to fluidly couple the intake passage to the intake manifold. The controller commands the ETV to close at 406 to restrict flow out of the exhaust pipe and a barometric pressure is measured at 408 by the pressure sensor in the exhaust manifold and the measured pressure is stored in the memory of the controller. At 410, the controller commands the wastegate to close to block flow through a turbine bypass passage arranged around the turbine. An electric motor, powered by a battery, such as battery 58 of FIGS. 1-2B, actuates the rotation of the turbine in a first direction (e.g., forward direction) at 412.

Spinning the turbine in the forward direction drives air from the engine intake, through the combustion chambers, into the exhaust manifold, and to the exhaust pipe, as shown in FIG. 2A. Pressure may rise in the exhaust pipe due to the flow restriction imposed by the ETV. The turbine may be spun at a pre-set speed that has been determined to increase pressure by a calculated amount in the exhaust pipe. For example, the turbine speed may be adapted to increase pressure by 25% or by 50% in the exhaust pipe. The pressure may be measured by a pressure sensor, such as pressure sensor 184 of FIGS. 1-2B, arranged upstream of the ECD in the exhaust pipe or integrated into the ECD, for example. In another example, the pressure in the exhaust pipe may be measured by a GPF pressure gauge. At 414 of the method, the exhaust pipe pressure is compared to a first threshold and a second threshold, or a threshold range of pressure for the expected exhaust pipe pressure. Comparing the exhaust pipe pressure to the first threshold and/or second threshold at 414 may include first spinning the turbine for a period of time, e.g., 2 seconds, after the rotational speed of the turbine reaches a pre-set speed to allow the speed of the turbine to stabilize. After the period of time for stabilization passes, the pressure in the exhaust manifold may be measured by a pressure sensor, such as pressure sensor 184 of FIGS. 1-2B, arranged upstream of the ECD in the exhaust pipe or integrated into the ECD.

The method at 414 may further include, first determining the first threshold based on the barometric pressure measured at 408. The first threshold may be a function of the measured barometric pressure and based on the amount of expected pressure increase due to turbine rotation at the pre-set speed. In one example, the controller may refer to look-up tables, which may be based on mapped data of exhaust pipe pressure according to barometric pressure, stored in the memory of the controller where the measured barometric pressure is the input and the first threshold (or expected pressure after running the turbine forward at the pre-set speed for the threshold duration or period of time) is the output. As another example, the controller may be configured to calculate a theoretical, final pressure in the exhaust pipe, which may be used as the first threshold, as a function of barometric pressure, turbine speed, and/or temperature. A measured pressure in the exhaust pipe that is higher than the first threshold may indicate that a blockage is present in the exhaust pipe while a pressure that is lower than the first threshold may indicate that either the exhaust pipe is blockage-free or that exhaust gas may be escaping from the exhaust system via a leak in the exhaust pipe. The method may return to method 300 of FIG. 3 to determine, at 314, if the pressure in the exhaust manifold is higher than the first threshold.

If the pressure in the exhaust pipe is higher than the first threshold, the method proceeds to 316 to set a diagnostic trouble code (DTC) to notify an operator that a blockage in the exhaust pipe is present. The method at 316 may further include indicating to the operator, via a signal sent to an indicator light, alarm, or other type of notifying device, that a blockage in the exhaust pipe is present. The DTC may also be set in the controller memory and be readable by a technician. If the pressure in the exhaust pipe is not higher than the first threshold, the method continues to 318 to determine if the pressure in the exhaust pipe is lower than a second threshold.

The second threshold may be a function of the measured barometric pressure and based on a range of pressures expected in the exhaust pipe when the exhaust pipe is blockage- and leak-free. The second threshold may be equivalent to a lower boundary of the range of pressures and thus may be set at a lower pressure than the first threshold. In some examples, the second threshold may be similar to or within a threshold range of the first threshold. In one example, the controller may refer to look-up tables, which may be based on mapped data of exhaust pipe pressure according to barometric pressure, stored in the memory of the controller where the measured barometric pressure is the input and the first threshold (or expected pressure range after running the turbine forward at the pre-set speed for the threshold duration or period of time) is the output. As another example, the controller may be configured to calculate a theoretical pressure range in the exhaust pipe, which may be used to determine the second threshold, as a function of barometric pressure, turbine speed, and/or temperature. A measured pressure in the exhaust pipe that is lower than the first threshold may indicate that a blockage is present in the exhaust pipe while a pressure equal to or higher than the second threshold may indicate that exhaust pipe is leak-free.

If the exhaust pipe pressure is lower than the second threshold, the method continues to 320 to set a DTC notification that a leak is present in the exhaust pipe. The method at 320 may further include indicating to the operator, via a signal sent to an indicator light, alarm, or other type of notifying device, that a leak in the exhaust pipe is present. The DTC may also be set in the controller memory and be readable by a technician. The method proceeds to 322 to diagnose the exhaust manifold for a leak.

The method also proceeds to 322 if the exhaust pipe pressure is not lower than the second threshold. Thus, the exhaust pipe pressure is between the first and second thresholds and may be leak- and blockage-free. As such, the exhaust manifold may be a source of degradation resulting in the torque shortfall. To check for a leak in the exhaust manifold, the method continues to method 500 of FIG. 5.

Looking at FIG. 5, at 502, the method includes adjusting the intake and exhaust valves of the engine cylinders to block flow through the combustion chambers. Adjusting the positions of the valves may include the controller commanding the actuator of the crankshaft, which may control rotation of the camshaft coupled to the intake and exhaust valves, to rotate until either the intake valves or the exhaust valves are in a fully closed position, or so that both the intake and exhaust valves and closed so that no airflow passes between the intake manifold and exhaust manifold. As one example, if the crankshaft is already stationary prior to starting method 500, the crankshaft may be rotated via rotational input from a motor/generator coupled with the crankshaft (e.g., electric machine 52 shown in FIG. 1) and then stopped to achieve the lack of opening overlap between the intake and exhaust valves. The throttle is commanded to close at 504 to block flow between the intake passage and the intake manifold. The barometric pressure is measured at 506 by the pressure sensor in the exhaust manifold and stored in the memory of the controller. The controller commands the ETV to open and the wastegate to remain closed at 508 to continue blocking flow through a turbine bypass passage. The electric motor may stop the rotation of the turbine, if the turbine is still spinning in the first direction, and then actuate the rotation of the turbine in the second direction (e.g., reverse direction) at 410. Alternatively, if the turbine is stationary, the electric motor initiates the reverse rotation.

Spinning the turbine in the reverse direction drives air flow in an opposite direction through the exhaust system compared to flow during engine operation. Air may flow into the exhaust pipe, through the ECD, through the turbine, and into the exhaust manifold, as shown in FIG. 2B. Since flow through the combustion chambers is blocked, pressure may accumulate in the exhaust manifold if the exhaust system is leak-free.

The turbine may be spun at a pre-set speed that has been determined to increase pressure by a calculated amount in the exhaust manifold. For example, the turbine speed may be adapted to increase pressure by 25% or by 50% in the exhaust manifold. At 512 of the method, the pressure is compared to a third threshold. Comparing the exhaust manifold pressure to the third threshold may include first spinning the turbine for a period of time, e.g., 2 seconds, after the turbine speed reaches a pre-set speed to allow the speed of the turbine to stabilize. After the period of time for stabilization passes, the pressure in the exhaust manifold may be measured.

The method at 512 may further include first determining the third threshold based on the barometric pressure measured at 506. The third threshold may be a function of the measured barometric pressure and based on the amount of expected pressure increase due to turbine rotation at the pre-set speed. In one example, the controller may refer to look-up tables, which may be based on mapped data of exhaust manifold pressure according to barometric pressure, stored in the memory of the controller where the measured barometric pressure is the input and the first threshold (or expected pressure after running the turbine in the reverse direction at the pre-set speed for the threshold duration or period of time) is the output. As another example, the controller may be configured to calculate a theoretical, final pressure in the exhaust manifold, which may be used as the third threshold, as a function of barometric pressure, turbine speed, and/or temperature. A measured pressure in the exhaust manifold that is lower than the third threshold may indicate that exhaust gas may be escaping from the exhaust system via a leak in the exhaust manifold. The method may return to method 300 to determine, at 324, if the pressure in the exhaust manifold is lower than the second threshold.

If the pressure in the exhaust manifold is lower than the third threshold, the method proceeds to 326 to set a diagnostic trouble code (DTC) to notify an operator that a leak in the exhaust manifold is present. The method at 326 may further include indicating to the operator, via a signal sent to an indicator light, alarm, or other type of notifying device, that a leak in the exhaust manifold is present. The DTC may also be set in the controller memory and be readable by a technician. If the exhaust manifold pressure is not lower than the second threshold, the routine is terminated and other diagnostic tests to evaluate other engine components for sources of degradation may be conducted. Repair of leaks or blockages indicated by DTCs may be addressed.

FIGS. 6 and 7 show example operational timing maps 600 and 700, respectively, for diagnosing an exhaust system of a vehicle engine system for leaks and blockages automatically upon engine shutdown and/or when degradation of the exhaust system is detected. The exhaust system (such as the exhaust system shown in FIGS. 1, 2A, and 2B) includes an exhaust manifold and an exhaust pipe, configured with pressure sensors in both regions of the exhaust system and timing map 600 depicts processes for evaluating leaks and blockages in the exhaust pipe while timing map 700 illustrates processes for detecting leaks in the exhaust manifold. Commencement of the example operations shown in FIGS. 6 and 7 may be initiated by an operator activated switch or the operations may be configured to occur routinely and automatically when the engine is turned off. An electrically driven turbine is positioned in the exhaust system between the exhaust manifold and the exhaust pipe.

As depicted in FIG. 6, an engine status is shown at plot 602, a throttle position is shown at plot 604, a position of an exhaust tuning valve (ETV) located at an end of the exhaust pipe (proximate to atmosphere) is shown at plot 606, a position of a wastegate arranged in a bypass passage that bypasses the turbine is shown at plot 608, and positions of intake and exhaust valves of combustion cylinders of the engine are shown at plots 609 and 610, respectively. Positions of the intake and exhaust valves may be adjusted between fully open and fully closed positions and any position in between.

A direction of rotation of the turbine is shown at plot 612. Pressure in the exhaust pipe is shown at plots 616, 618, and 620, depicting three possible scenarios, and may be measured by a gas particulate filter pressure sensor (e.g., gage pressure sensor) arranged in the exhaust pipe downstream of the turbine and immediately upstream of an ECD (which includes the GPF) or integrated into the ECD. The exhaust pipe pressure is compared to a first threshold shown at plot 614 and a second, lower threshold shown at plot 615. Elements in FIG. 7 that are common to FIG. 6 are similarly numbered. In FIG. 7, pressure in the exhaust manifold is shown, instead of in the exhaust pipe, at plots 704 and 706, and compared to a second threshold 702. Pressure in the exhaust manifold may be measured by a pressure sensor arranged in the exhaust manifold.

Prior to t1, the engine is running (602) but the vehicle may be stopped and the throttle closed (604). The ETV is open (606), and the wastegate (608) is in a partially open position to moderate turbine speed. The intake valve is closed (610) and the turbine (612) is spinning in a forward direction. The pressure in the exhaust pipe may be relatively high (616) if a blockage is present, relatively low (620) if a leak is present, or at a pressure in between (618) if no degradation to the exhaust pipe is present.

At t1, the engine is turned off and moving engine components (e.g., crankshaft) decelerate to a stop between t1 and t2. During this interval the throttle remains closed and the ETV and wastegate are maintained open. The position of the intake and exhaust valves is also adjusted so that the intake valves are closed at t2. The rotational speed of the turbine decreases and comes to a halt between t1 and t2, resulting in a decrease in the exhaust pipe pressure. As the crankshaft decelerates, the controller commands an adjustment in deceleration of the crankshaft to adjust a camshaft position to close (or maintain closed) the intake and exhaust valves, thereby blocking air flow through the engine cylinders. The engine is stationary by t2.

At t2, the throttle is opened and both the wastegate and the ETV are closed. The crankshaft is rotated to a position where intake and exhaust valves begin to open at t2. Adjusting the crankshaft while the engine is off may include rotating the crankshaft by an electrical motor powered by an energy storage device, such as an electrical motor and a battery of a hybrid engine system. However, if the engine is not a hybrid engine, the engine may be rotated by the starter motor briefly to allow the intake and exhaust valves to be opened before testing of the exhaust manifold commences. Pressure in the exhaust pipe is at a minimum (e.g., at atmospheric pressure). A barometric pressure measurement is obtained from the exhaust manifold. The rotation of the turbine is actuated in the forward direction after a brief period to allow the adjustments of the throttle, wastegate, and ETV to be completed. Between t2 and t3, which may be a period of at least 2 seconds, the throttle opening increases and the turbine speed increases until a pre-set speed is reached. The exhaust pipe pressure increases while positions of the various valves are maintained.

At t3, the rotation of the turbine stabilizes and the pressure in the exhaust pipe plateaus. Positions of all the valves are maintained. After t3 the pressure in the exhaust pipe is compared to a first threshold pressure (614) that is calculated as a function of the measured barometric pressure and the speed of the turbine. If the exhaust pipe pressure (616) is higher than the first threshold (614), a DTC is set, indicating a blockage in the pipe. If the exhaust pipe pressure is lower than the first threshold (e.g., 618 and 620), then the exhaust pipe pressure is compared to the second threshold (615). An exhaust pipe pressure (620) that is lower than the second threshold (615) leads to setting a DTC to indicate a leak in the pipe, and operations continue to timing map 700 of FIG. 7. If the exhaust pipe pressure (618) is at the second threshold (615), the exhaust pipe is deemed leak-free and operations according to timing map 700 are performed.

The engine is maintained off and the wastegate maintained closed throughout the operations of timing map 700. At t1, the throttle is adjusted to a fully closed position and the ETV is opened. The crankshaft is adjusted so that the intake valves and exhaust valves are closed. Adjusting the crankshaft while the engine is off may include rotating the crankshaft by an electrical motor powered by an energy storage device, such as an electrical motor and a battery of a hybrid engine system. However, if the engine is not a hybrid engine, the engine may be rotated by the starter motor briefly to allow the intake and exhaust valves to be closed before testing of the exhaust manifold commences.

The electric motor driving rotation of the turbine is deactivated at t1 and the turbine decelerates, becoming briefly stationary between t1 and t2 before spinning in the reverse direction is initiated. The barometric pressure is measured in the exhaust manifold during the period when the turbine is still. The pressure in the exhaust manifold is initially at atmospheric pressure until the turbine begins rotating in the reverse direction. Thereafter, pressure in the exhaust manifold increases.

At t2, the turbine rotation is stabilized and exhaust manifold pressure stabilizes. If the pressure (704) is equal to a third threshold (702), also calculated as a function of the barometric pressure and speed of the turbine, the exhaust manifold is intact. However, if the exhaust manifold pressure is lower (706) than the third threshold, a DTC is set, indicating a leak in the exhaust manifold.

In this way, an exhaust system of a vehicle may be diagnosed for leaks and blockages and a source of the degradation in the exhaust system may be identified. The methods described herein for the diagnosis may be requested by an operator or configured to be performed as a routine maintenance check, automatically when an engine of the vehicle is turned off. By rotating an electrically driven turbine of a turbocharger when the engine is off, the rotation in a first direction may allow evaluation of an exhaust pipe for leaks and blockages by comparing a measured pressure in the exhaust pipe to first and second predetermined threshold pressures. Rotating the turbine in a second direction provides detection of leaks in an exhaust manifold by similarly comparing a measured pressure in the exhaust manifold to a third predetermined threshold pressure. The diagnosis may be conducted without additional parts beyond already existing components in the vehicle and provides a reliable testing method by using thresholds that are functions of measured barometric pressure. The technical effect of using the electric turbocharger to generate pressure in targeted regions of the exhaust system is that leaks and blockages may be identified with equal integrity for each test trial, and without adding additional sensors or controls that may complicate engine control during engine operation and/or increase engine costs.

As one embodiment, a method includes upon engine shutdown, operating an electric turbocharger to draw air into an exhaust system and indicating degradation of the exhaust system based on a comparison of a pressure in the exhaust system measured during operating the electric turbocharger to a threshold pressure that is based on a barometric pressure. In a first example of the method the barometric pressure is measured in an exhaust manifold of the exhaust system before operating the electric turbocharger, following engine shutdown. A second example of the method optionally includes the first example, and further includes wherein operating the electric turbocharger includes spinning a turbine of the electric turbocharger in a first, forward direction and wherein the pressure in the exhaust system is a measured exhaust pipe pressure measured via a pressure sensor arranged directly upstream of or at a particulate filter arranged in an exhaust pipe of the exhaust system, downstream of the turbine. A third example of the method optionally includes one or more of the first and second examples, and further includes, upon engine shutdown and prior to spinning the turbine in the forward direction and measuring the pressure in the exhaust system, adjusting a stopping position of a crankshaft so that opening of intake and exhaust valves of each engine cylinder are overlapping so that air flows through the engine cylinders during the operating the electric turbocharger, and opening an intake throttle. A fourth example of the method optionally includes one or more of the first through third examples, and further includes, wherein indicating degradation includes indicating a leak in the exhaust pipe in response to the measured exhaust pipe pressure being less than a first threshold pressure, the first threshold pressure based on the barometric pressure and indicating a blockage in the exhaust pipe in response to the measured exhaust pipe pressure being greater than a second threshold pressure, the second threshold pressure based on the barometric pressure. A fifth example of the method optionally includes one or more of the first through fourth examples, and further includes, wherein operating the electric turbocharger includes spinning a turbine of the electric turbocharger in a second, reverse direction while an intake throttle is closed. A sixth example of the method optionally includes one or more of the first through fifth examples, and further includes, upon engine shutdown and prior to spinning the turbine in the reverse direction and measuring the pressure in the exhaust system, adjusting a stopping position of a crankshaft so that opening of intake and exhaust valves of each engine cylinder are not overlapping so that no air flows through the engine cylinders during the operating the electric turbocharger. A seventh example of the method optionally includes one or more of the first through sixth examples, and further includes, wherein the pressure in the exhaust system is an exhaust manifold pressure measured in an exhaust manifold, the exhaust manifold arranged in the exhaust system, upstream of the turbine, and wherein indicating degradation includes indicating a leak in the exhaust system, upstream of the turbine, in response to the measured pressure in the exhaust system being less than a third threshold pressure, the third threshold pressure based on the barometric pressure.

As another embodiment, a method includes following an engine key-off event and after a crankshaft of an engine stops spinning, electrically driving rotation of a turbine disposed in an exhaust system of the engine in a first, forward direction and pumping air from an intake system of the engine into an exhaust pipe of the exhaust system arranged downstream of the turbine and measuring a first pressure in the exhaust pipe, electrically driving rotation of the turbine in a second, reverse direction and pumping air from the exhaust pipe into an exhaust manifold of the exhaust system and measuring a second pressure in the exhaust manifold, and indicating degradation of one or more of the exhaust pipe and the exhaust manifold of the exhaust system based on the first pressure and the second pressure relative to a barometric pressure. In a first example of the method, wherein the first pressure is measured by a first pressure sensor arranged between the turbine and an emission control device positioned at a downstream end of the exhaust pipe and the second pressure is measured by a second pressure sensor positioned in the exhaust manifold. A second example of the method optionally includes the first example, and further includes prior to electrically driving rotation of the turbine in the first direction, adjusting a position of the crankshaft so that opening of an intake valve and an exhaust valve of each engine cylinder overlap to allow airflow through each engine cylinder and opening an intake throttle. A third example of the method optionally includes one or more of the first and second examples, and further includes, prior to electrically driving the turbine in the first direction, closing an exhaust tuning valve positioned in the exhaust pipe, downstream of an emission control device and upstream of an outlet of the exhaust pipe. A fourth example of the method optionally includes one or more of the first through third examples, and further includes, wherein indicating degradation includes indicating a blockage in the exhaust pipe in response to the first pressure being higher than a first threshold pressure, the first threshold determined as a function of the barometric pressure and turbine speed of the turbine during the electrically driving rotation of the turbine in the first direction. A fifth example of the method optionally includes one or more of the first through fourth examples, and further includes, wherein indicating degradation includes indicating a leak in the exhaust pipe in response to the first pressure being lower than a second threshold pressure that is determine as a function of the barometric pressure and turbine speed of the turbine during the electrically driving rotation of the turbine in the first direction. A sixth example of the method optionally includes one or more of the first through fifth examples, and further includes, prior to electrically driving rotation of the turbine in the second direction, adjusting a position of the crankshaft so that opening of an intake valve and an exhaust valve of each engine cylinder do not overlap to prevent airflow through each engine cylinder. A seventh example of the method optionally includes one or more of the first through sixth examples, and further includes, wherein indicating degradation includes indicating a leak in the exhaust manifold in response to the second pressure being lower than a third threshold pressure, the third threshold pressure determined as a function of the barometric pressure and turbine speed of the turbine during the electrically driving rotation of the turbine in the second direction.

As another embodiment, a system for a vehicle includes a controller with computer readable instructions stored on non-transitory memory that, when executed during an engine-off condition, cause the controller to obtain a barometric pressure after an engine stops spinning and determine one or more pressure thresholds based on the barometric pressure, drive rotation of an electric turbocharger in a direction to draw air into an exhaust system, measure an exhaust system pressure in an exhaust system of the engine, and indicate degradation of the exhaust system in response to the measured exhaust system pressure being outside of the one or more pressure thresholds. In a first example of the system a first pressure sensor is disposed in the exhaust system, downstream of a turbine of the electric turbocharger and directly upstream of a particulate filter disposed in the exhaust system, wherein the direction that the electric turbocharger is driven to rotate is a first, forward direction which draws air into the exhaust system from an intake system of the engine, and wherein the measured exhaust system pressure is measured via the first pressure sensor. A second example of the system optionally includes the first example and further includes a second pressure sensor disposed in an exhaust manifold of the engine, upstream of a turbine of the electric turbocharger, wherein the direction that the electric turbocharger is rotated is a second, reverse direction which draws air into the exhaust system from outside of the exhaust system, and wherein the measured exhaust system pressure is measured via the second pressure sensor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:

upon engine shutdown, operating an electric turbocharger to draw air into an exhaust system and indicating degradation of the exhaust system based on a comparison of a pressure in the exhaust system measured during operating the electric turbocharger to a threshold pressure that is based on a barometric pressure.

2. The method of claim 1, further comprising measuring the barometric pressure in an exhaust manifold of the exhaust system before operating the electric turbocharger, following engine shutdown.

3. The method of claim 1, wherein operating the electric turbocharger includes spinning a turbine of the electric turbocharger in a first, forward direction and wherein the pressure in the exhaust system is a measured exhaust pipe pressure measured via a pressure sensor arranged directly upstream of or at a particulate filter arranged in an exhaust pipe of the exhaust system, downstream of the turbine.

4. The method of claim 3, further comprising, upon engine shutdown and prior to spinning the turbine in the forward direction and measuring the pressure in the exhaust system, adjusting a stopping position of a crankshaft so that opening of intake and exhaust valves of each engine cylinder are overlapping so that air flows through the engine cylinders during the operating the electric turbocharger, and opening an intake throttle.

5. The method of claim 3, wherein indicating degradation includes indicating a leak in the exhaust pipe in response to the measured exhaust pipe pressure being less than a first threshold pressure, the first threshold pressure based on the barometric pressure and indicating a blockage in the exhaust pipe in response to the measured exhaust pipe pressure being greater than a second threshold pressure, the second threshold pressure based on the barometric pressure.

6. The method of claim 1, wherein operating the electric turbocharger includes spinning a turbine of the electric turbocharger in a second, reverse direction while an intake throttle is closed.

7. The method of claim 6, further comprising, upon engine shutdown and prior to spinning the turbine in the reverse direction and measuring the pressure in the exhaust system, adjusting a stopping position of a crankshaft so that opening of intake and exhaust valves of each engine cylinder are not overlapping so that no air flows through the engine cylinders during the operating the electric turbocharger.

8. The method of claim 6, wherein the pressure in the exhaust system is an exhaust manifold pressure measured in an exhaust manifold, the exhaust manifold arranged in the exhaust system, upstream of the turbine, and wherein indicating degradation includes indicating a leak in the exhaust system, upstream of the turbine, in response to the measured pressure in the exhaust system being less than a third threshold pressure, the third threshold pressure based on the barometric pressure.

9. A method, comprising, following an engine key-off event and after a crankshaft of an engine stops spinning:

electrically driving rotation of a turbine disposed in an exhaust system of the engine in a first, forward direction and pumping air from an intake system of the engine into an exhaust pipe of the exhaust system arranged downstream of the turbine and measuring a first pressure in the exhaust pipe;

electrically driving rotation of the turbine in a second, reverse direction and pumping air from the exhaust pipe into an exhaust manifold of the exhaust system and measuring a second pressure in the exhaust manifold; and indicating degradation of one or more of the exhaust pipe and the exhaust manifold of the exhaust system based on the first pressure and the second pressure relative to a barometric pressure.

10. The method of claim 9, wherein the first pressure is measured by a first pressure sensor arranged between the turbine and an emission control device positioned at a downstream end of the exhaust pipe and the second pressure is measured by a second pressure sensor positioned in the exhaust manifold.

11. The method of claim 9, further comprising, prior to electrically driving rotation of the turbine in the first direction, adjusting a position of the crankshaft so that opening of an intake valve and an exhaust valve of each engine cylinder overlap to allow airflow through each engine cylinder and opening an intake throttle.

12. The method of claim 11, further comprising, prior to electrically driving the turbine in the first direction, closing an exhaust tuning valve positioned in the exhaust pipe, downstream of an emission control device and upstream of an outlet of the exhaust pipe.

13. The method of claim 12, wherein indicating degradation includes indicating a blockage in the exhaust pipe in response to the first pressure being higher than a first threshold pressure, the first threshold determined as a function of the barometric pressure and turbine speed of the turbine during the electrically driving rotation of the turbine in the first direction.

14. The method of claim 12, wherein indicating degradation includes indicating a leak in the exhaust pipe in response to the first pressure being lower than a second threshold pressure that is determine as a function of the barometric pressure and turbine speed of the turbine during the electrically driving rotation of the turbine in the first direction.

15. The method of claim 9, further comprising, prior to electrically driving rotation of the turbine in the second direction, adjusting a position of the crankshaft so that opening of an intake valve and an exhaust valve of each engine cylinder do not overlap to prevent airflow through each engine cylinder.

16. The method of claim 15, wherein indicating degradation includes indicating a leak in the exhaust manifold in response to the second pressure being lower than a third threshold pressure, the third threshold pressure determined as a function of the barometric pressure and turbine speed of the turbine during the electrically driving rotation of the turbine in the second direction.

17. The method of claim 9, wherein indicating degradation includes one or more of setting a diagnostic code in a controller of the engine and notifying an operator of a vehicle in which the engine is installed that one or more components of the exhaust system is degraded.

18. A system for an engine, comprising:

a controller with computer readable instructions stored on non-transitory memory that, when executed during an engine-off condition, cause the controller to:

obtain a barometric pressure after the engine stops spinning and determine one or more pressure thresholds based on the barometric pressure;

drive rotation of an electric turbocharger in a direction to draw air into an exhaust system;

measure an exhaust system pressure in an exhaust system of the engine; and indicate degradation of the exhaust system in response to the measured exhaust system pressure being outside of the one or more pressure thresholds.

19. The system of claim 18, further comprising a first pressure sensor disposed in the exhaust system, downstream of a turbine of the electric turbocharger and directly upstream of a particulate filter disposed in the exhaust system, wherein the direction that the electric turbocharger is driven to rotate is a first, forward direction which draws air into the exhaust system from an intake system of the engine, and wherein the measured exhaust system pressure is measured via the first pressure sensor.

20. The system of claim 18, further comprising a second pressure sensor disposed in an exhaust manifold of the engine, upstream of a turbine of the electric turbocharger, wherein the direction that the electric turbocharger is rotated is a second, reverse direction which draws air into the exhaust system from outside of the exhaust system, and wherein the measured exhaust system pressure is measured via the second pressure sensor.

* * * * *